(12) United States Patent
Borom

(10) Patent No.: US 8,606,658 B2
(45) Date of Patent: Dec. 10, 2013

(54) INVENTORY VERIFICATION SYSTEM AND METHOD

(75) Inventor: Michael Preston Borom, Westport, CT (US)

(73) Assignee: RGIS, LLC, Auburn Hills, MI (US)

( * ) Notice: Subject to any disclaimer, the term of this patent is extended or adjusted under 35 U.S.C. 154(b) by 297 days.

(21) Appl. No.: 12/204,435

(22) Filed: Sep. 4, 2008

(65) Prior Publication Data
US 2009/0210325 A1   Aug. 20, 2009

(51) Int. Cl.
*G06Q 10/00* (2012.01)
(52) U.S. Cl.
USPC .......................................................... 705/28
(58) Field of Classification Search
USPC .......................................... 705/28; 340/10.1
See application file for complete search history.

(56) References Cited

U.S. PATENT DOCUMENTS

| | | | | |
|---|---|---|---|---|
| 5,218,190 | A * | 6/1993 | Hardesty et al. | 235/462.01 |
| 5,611,051 | A * | 3/1997 | Pirelli | 705/10 |
| 5,644,725 | A | 7/1997 | Schmerer | |
| 6,089,453 | A * | 7/2000 | Kayser et al. | 235/383 |
| 6,779,726 | B1 * | 8/2004 | Easton | 235/462.01 |
| 7,275,070 | B2 * | 9/2007 | Kataria et al. | 1/1 |
| 7,469,820 | B2 * | 12/2008 | Rosenblum | 235/375 |
| 2001/0000019 | A1 * | 3/2001 | Bowers et al. | 340/572.1 |
| 2002/0010633 | A1 * | 1/2002 | Brotherston | 705/26 |
| 2004/0103023 | A1 * | 5/2004 | Irwin et al. | 705/14 |
| 2004/0188524 | A1 * | 9/2004 | Lunak et al. | 235/385 |
| 2005/0068168 | A1 * | 3/2005 | Aupperle et al. | 340/539.13 |
| 2006/0085295 | A1 | 4/2006 | Droste et al. | |
| 2006/0095347 | A1 * | 5/2006 | Melucci et al. | 705/28 |
| 2006/0249576 | A1 * | 11/2006 | Nakada et al. | 235/382 |
| 2006/0253346 | A1 * | 11/2006 | Gomez | 705/28 |
| 2007/0005459 | A1 * | 1/2007 | Fowler | 705/28 |
| 2007/0138280 | A1 * | 6/2007 | Skaistis et al. | 235/451 |
| 2007/0180485 | A1 * | 8/2007 | Dua | 725/114 |
| 2007/0203811 | A1 | 8/2007 | Hoopes et al. | |
| 2008/0120205 | A1 * | 5/2008 | Hoopes et al. | 705/28 |
| 2008/0197195 | A1 * | 8/2008 | Miller et al. | 235/440 |
| 2008/0238621 | A1 * | 10/2008 | Rofougaran et al. | 340/10.1 |
| 2009/0316950 | A1 * | 12/2009 | Alasia et al. | 382/100 |
| 2011/0302201 | A1 * | 12/2011 | Ogaz et al. | 707/769 |
| 2012/0118957 | A1 * | 5/2012 | Miller et al. | 235/439 |

OTHER PUBLICATIONS

Letter dated Mar. 2, 2010 from Anthony F. Radd enclosing Ex. 1 entitled "CVS Inventory Account Instructions" and Ex. 2 entitled "Audit Sku Count (Manager's Buddy Machine)."

* cited by examiner

*Primary Examiner* — Seye Iwarere
(74) *Attorney, Agent, or Firm* — Harness, Dickey & Pierce, P.L.C.

(57) ABSTRACT

A system and method of verifying the completeness and accuracy of inventory records is disclosed. A remote verification device is deployable from a control desk to a specified area within a facility to acquire certain verification data. Once acquired, the verification data is compared with the inventory records on the verification device to determine a verification status. The particular mode of verification may be user-selected on the verification device or device-prompted based the inventory records, the verification data or other parameters. If successfully verified, the verification device communicates the verification data and/or verification status to the control desk. If not successfully verified, the verification device may be used to acquire inventory data for replacing the inventory records or providing an alert related to the discrepancy.

19 Claims, 6 Drawing Sheets

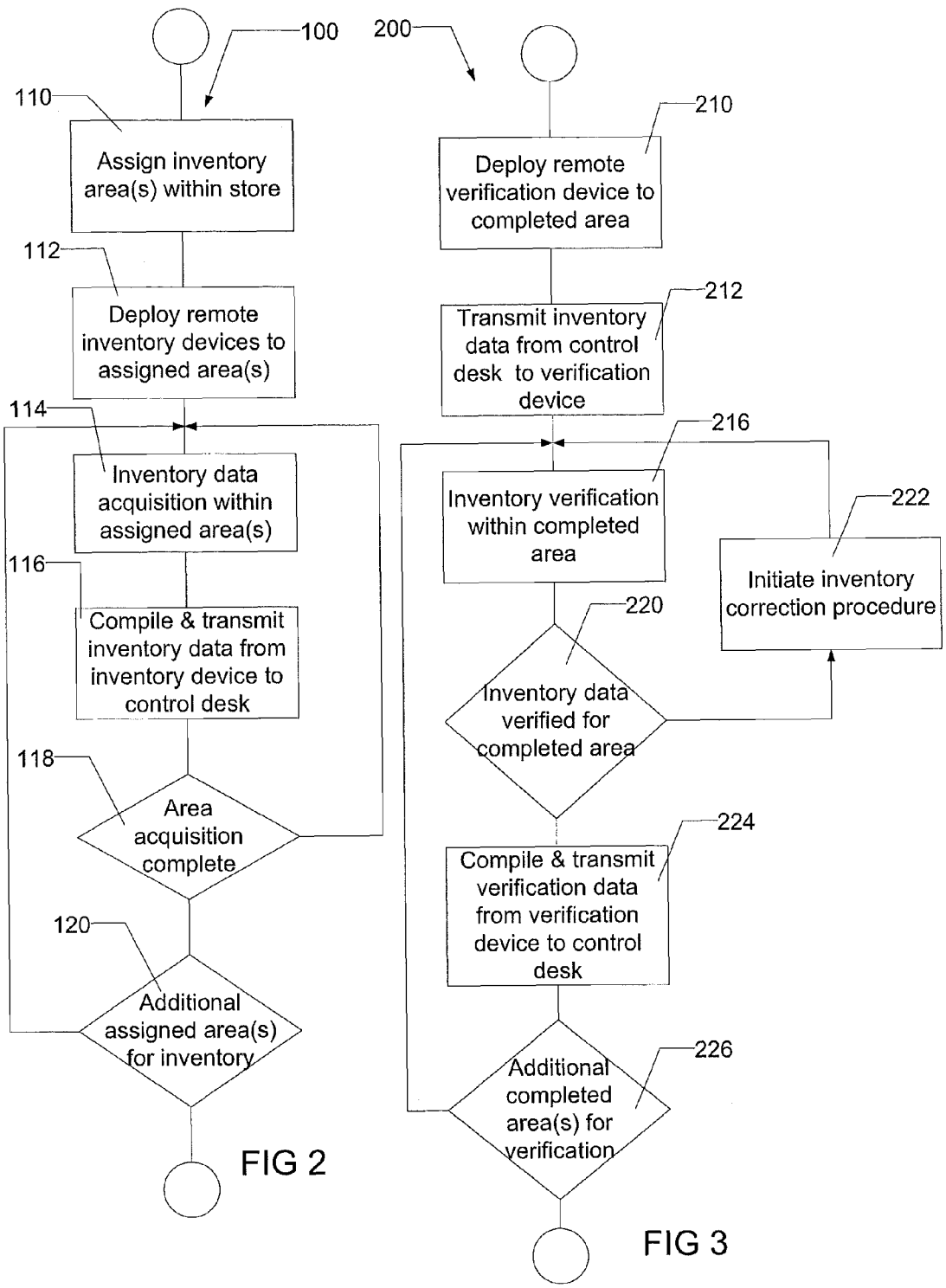

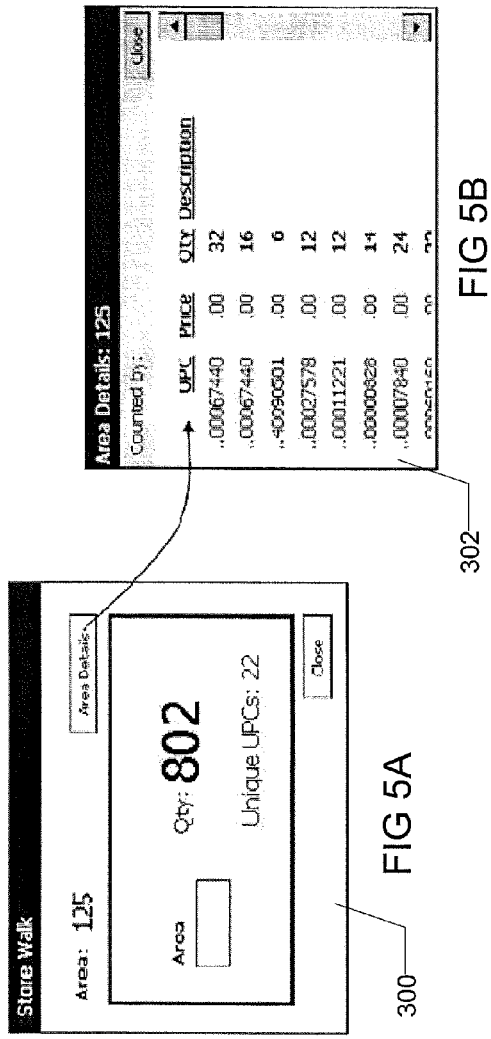
FIG 5A
FIG 5B
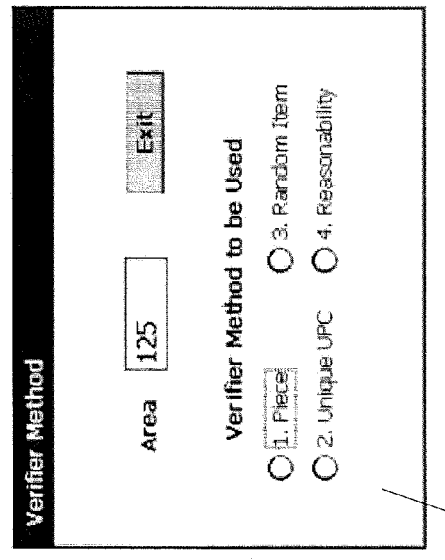
FIG 6
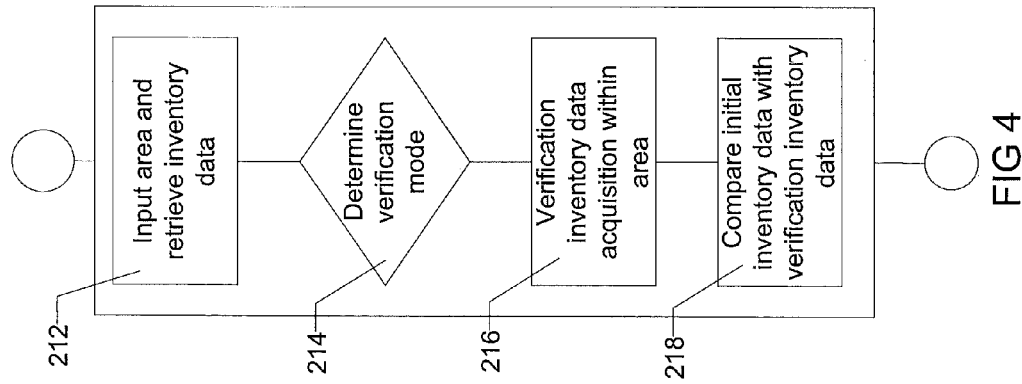
FIG 4

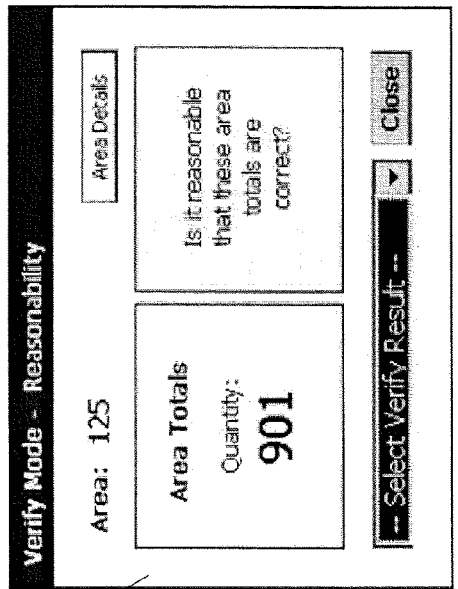
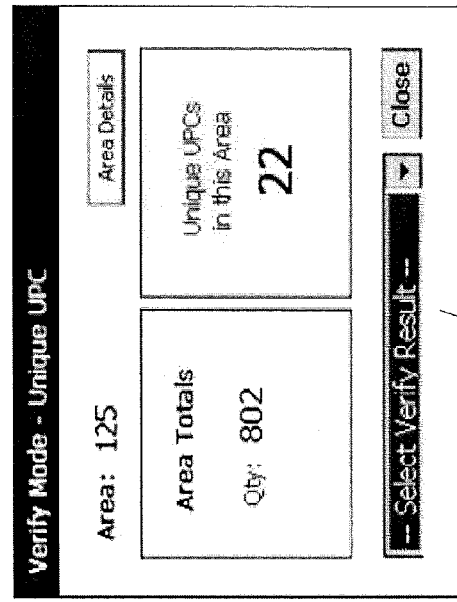
FIG 8
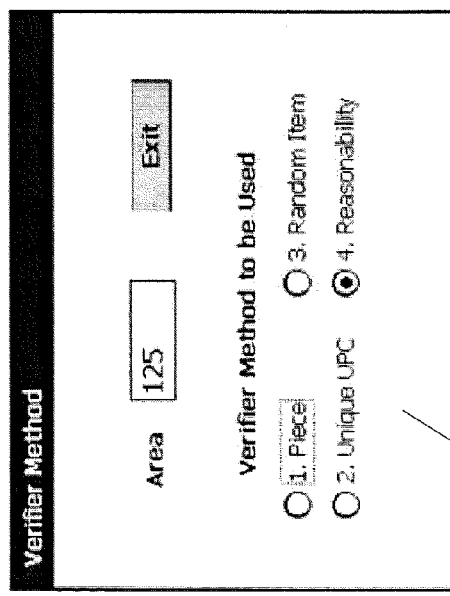
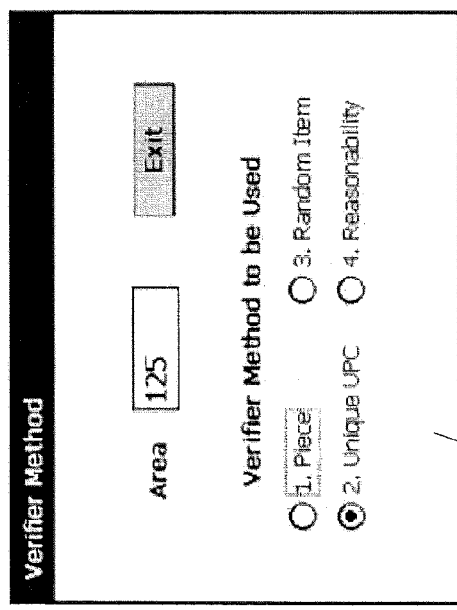
FIG 9

INVENTORY VERIFICATION SYSTEM AND METHOD

FIELD

The present disclosure relates to inventory data acquisition and more specifically to verification of inventory data to ensure an accurate capture of information for every item at a location and thus avoid inventory data errors.

BACKGROUND

The statements in this section merely provide background information related to the present disclosure and may not constitute prior art.

In general, inventory is product in any form, e.g., consumer goods, parts, raw materials, documents or other tangible items stored within a facility. A record of the inventory including attributes, such as identification by SKU, UPC or other identifying symbology, quantity, location, and product category are maintained. The data for these records may be compiled from transaction documentation such as delivery receipts, bills of lading, purchase orders, purchase receipts, and/or any other suitable procurement documents, or from a physical audit of the products stored at the facility. Regardless of the manner used to generate the inventory dataset, discrepancies may exist between the inventory records and the actual inventory of products stored within the facility. The inventory dataset can be verified and, if necessary, reconciled to minimize and ultimately eliminate these discrepancies;

Prior methods of verification require that the inventory records be printed out in a predetermined format which is then taken to a specific area in the facility for comparison to the inventory physically located there. These methods are inflexible, tedious and time consuming because the mode of verification is strictly dependant on the predetermined format of the printed reports and requires a repeated reference to the report and comparison with the actual inventory.

The present disclosure is directed to overcoming one or more of the shortcomings set forth above.

SUMMARY

In one aspect, the present disclosure is directed to a method for verifying inventory. The method includes downloading an inventory dataset from a control desk to a remote verification device. The inventory dataset includes downloaded inventory data for an audited or completed inventory area. The remote verification device is then deployed to the verification area and verification data is acquired with the remote verification device. The verification method and type of verification data acquired is based on a menu-driven application selected for a specific verification area. Once acquired, the verification data is compared with the downloaded inventory data on the remote verification device and a verification status is made based on the comparison. The verification device may transmit the verification data and/or verification status to the control desk. If the inventory data is not successfully verified, the verification device may be used to acquire inventory data for updating, supplementing or replacing the inventory records.

In another aspect, the present disclosure is directed to a system having an inventory control desk including a dataset with inventory data, a remote inventory device and a remote verification device. The remote verification device includes a data input module, a verification module and a display. The data input module includes a keypad and a scanner for acquiring verification data. The verification module which is typically a programmed microprocessor enables the selection of a verification mode, compares the verification data with the inventory data and generates a verification status. The display provides a graphical interface for communicating information from the verification device. The system further includes a local area network for enabling wireless communication between the control desk and the portable verification device. The network includes a wireless network interface controller (WNIC) associated with each of the control desk and the verification device. The local area network allows data signals to be communicated between the inventory control desk and the verification device for transmission of data as well as directing the timing and process of conducting the inventory verification.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a flow chart generally illustrating an inventory counting and accumulation methodology;

FIG. 3 is a flow chart generally illustrating an inventory verification methodology;

FIG. 4 is a flow chart specifically illustrating the inventory verification methodology of a designated area with the within the retail facility;

FIG. 5A illustrates a screenshot of the verification device display showing summary information of the inventory data for a specific area;

FIG. 5B illustrates a screenshot of the verification device display showing UPC and quantity information of the inventory data for a specific area;

FIG. 6 illustrates a screenshot of the verification device display showing the selectable verification mode interface;

FIG. 8 illustrates screenshots of the verification device display in a reasonability verification mode;

FIG. 9 illustrates screenshots of the verification device display in a unique UPC mode.

DETAILED DESCRIPTION

Figure 1:
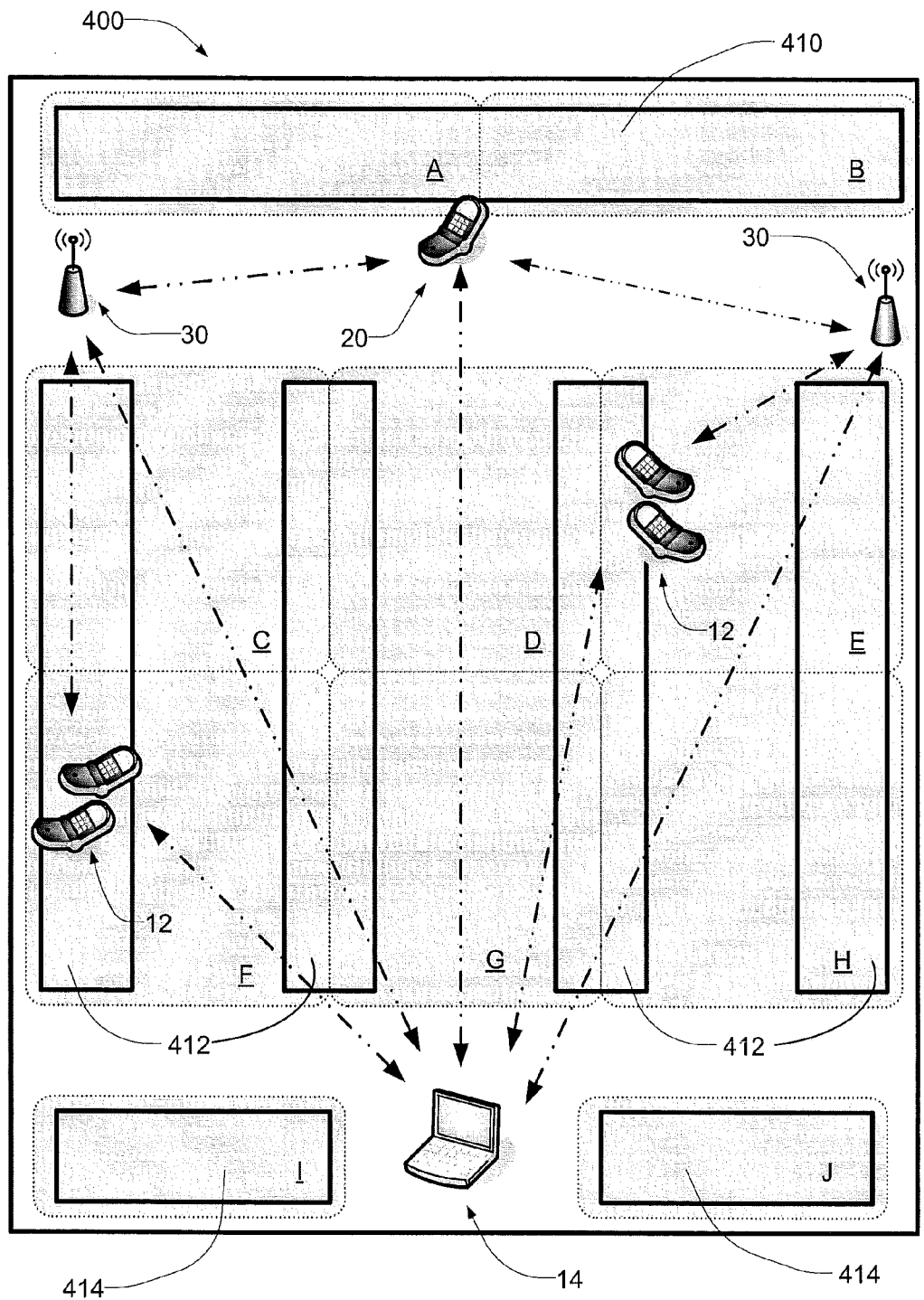
FIG. 1 is a schematic representation of an inventory verification system implemented in a merchandising or retail facility.

The following description is merely exemplary in nature and is not intended to limit the present disclosure, application, or uses. It should be understood that throughout the drawings, corresponding reference numerals indicate like or corresponding parts and features.

An inventory counting and accumulation system and method are schematically illustrated in FIGS. 1 and 2. A facility such as a retail store 400 includes a number of fixtures 410, 412, 414 located throughout the store 400. These fixtures 410-414 may be shelves, end caps, gondolas or other structures designed to store and display products. Periodically, an audit or count of these products, collectively know as inventory, may be made to accumulate data concerning the number and characteristics of product in the store 400. An inventory system 10 which includes a remote inventory device 12, a control desk 14, a remote verification device 20 and wireless network interface connections or WNICS 30 are deployed in the store 400 for purposes of conducting the inventory audit.

The remote inventory devices 12 and the verification device 20 include a data input module and a display. The data input module includes a keypad and a scanner for acquiring data. The display provides a graphical interface for communicating information from the device. The remote inventory devices 12 include an inventory module which is typically a programmed microprocessor enabling the selection of an inventory mode, input of the inventory area and inventory data from the inventory area, and generation of an inventory dataset. The remote verification devices 20 include a verification module which is typically a programmed microprocessor enabling the selection of a verification mode, comparison of the verification dataset with the inventory dataset and generation of a verification status.

The system further includes a local area network (LAN) for enabling wireless communication between the control desk 14 and the remote devices 12, 20. The LAN includes one or more wireless network interface controllers 30. The local area network allows data signals to be communicated between the control desk 14 and the remote devices 12, 20 for transmission of data as well as directions for the timing and process of conducting the inventory audit.

The inventory verification system includes a control desk 14 which communicates wirelessly with the remote devices 12, 20. In one embodiment, the control desk 14 communicates directly with the remote devices 12, 20 deployed in the store. In another embodiment, WNICs 30 are included in the system to extend the range of communication between the remote devices 12, 20 and the control desk 14. The remote devices 12, 20, the control desk 14 and the WNICs 30 use a standardized communication protocol, e.g., IEEE 802.11 a/b/g, wireless USB, or Bluetooth.

When initiating an audit, the store 400 is divided into different areas as represented in step 110 in FIG. 2. For example, store 400 in FIG. 1 is divided into ten distinct areas designated as inventory areas A-J. One or more remote inventory devices 12 are deployed from a control desk 14 to an inventory area, for example, area E and area F as represented in step 112. Each remote inventory device 12 is used to compile inventory data of products within the assigned area as represented in step 114. The inventory data may simply be product counts for the area or further include SKU or UPC data, or other identifying symbology, location, or product category. Inventory data acquired by the remote inventory device 12 is compiled and transmitted back to the control desk 14 as represented in step 116.

The inventory data may be communicated in near real-time from the remote inventory device 12 to the control desk 14 or may be periodically transmitted as the counting process progresses to completion. Once an area is completed, the remote inventory device 12 communicates the inventory data to the control desk 14 and provides an area acquisition complete message as represented in step 118. The inventory control desk 14 compiles the inventory data for the assigned area into an inventory dataset representing the entire store 400. At this point, the remote inventory device 12 may be instructed to move to an uncounted area within the store 400, such as area G in FIG. 1 as represented in step 120. Alternately, the remote inventory device 12 may be instructed to return to the control desk 14 for re-assignment.

After an inventory audit has been completed, it may be desirable to verify the inventory dataset. A remote verification device 20 is deployed to a completed inventory area (hereinafter referred to as a "verification area") as represented in step 210 of FIG. 3. Once assigned a verification area, the control desk 14 communicates the previously acquired inventory dataset for the assigned verification area as well as instructions concerning the verification procedure as represented in step 212. Different verification methods may be used depending on the products located within the verification area or based on the judgment or discretion of the person responsible for conducting the inventory process as represented at step 214. Various verification modes executable on a remote verification device 20 are described in greater detail below in paragraphs 0032-0036.

At this point, the inventory dataset can be selectively retrieved and displayed on the remote verification device 20. For example, a summary of the inventory quantity and the unique UPC codes within a verification area. As shown at screen 300 in FIG. 5A, the inventory dataset for area 125 includes an inventory count of 802 pieces and 22 unique UPCs. Further details of the inventory dataset may be retrieved and displayed by selecting an Area Details list which provides an inventory count for each unique UPC as shown at screen 302 in FIG. 5B. The inventory dataset may have additional information, such as price, category, or other descriptions, which may be displayed as an area detail.

Next, the remote verification device 20 is used to acquire verification data for the verification area as represented in step 216 of FIG. 3. This procedure is similar to that used to count and accumulate inventory data as previously described. The verification dataset is then compared to the inventory dataset based on a set of rules determined by the selected verification mode. This verification process is performed locally on the remote verification device 20 as represented in step 218. If the verification dataset matches the inventory dataset, then the inventory dataset is verified as represented at step 220.

If the verification dataset does not match the inventory dataset, then an error exists and a correction procedure may be initiated as represented in step 222. Correction of the inventory dataset may be performed on the remote verification device 20. Alternatively, a remote inventory device 12 may be re-deployed to the area to perform the necessary corrections. The verification data including a verification status is compiled and transmitted to the control desk 14 as represented at step 224. Once the remote verification device 20 completes verification of its assigned area, it may be deployed to other complete inventory areas for verification as represented at step 226.

The remote verification device 20 is selectively configured to perform one of various verification methods. Presently, these methods include piece verification, reasonability verification, unique UPC verification and random item verification. The particular method of verification for a given verification area may be selected on the remote verification device 20 as at screen 304 shown in FIG. 6. Once the verification method is selected, the remote verification device 20 will prompt its user through the procedure for verification.

Figure 7:
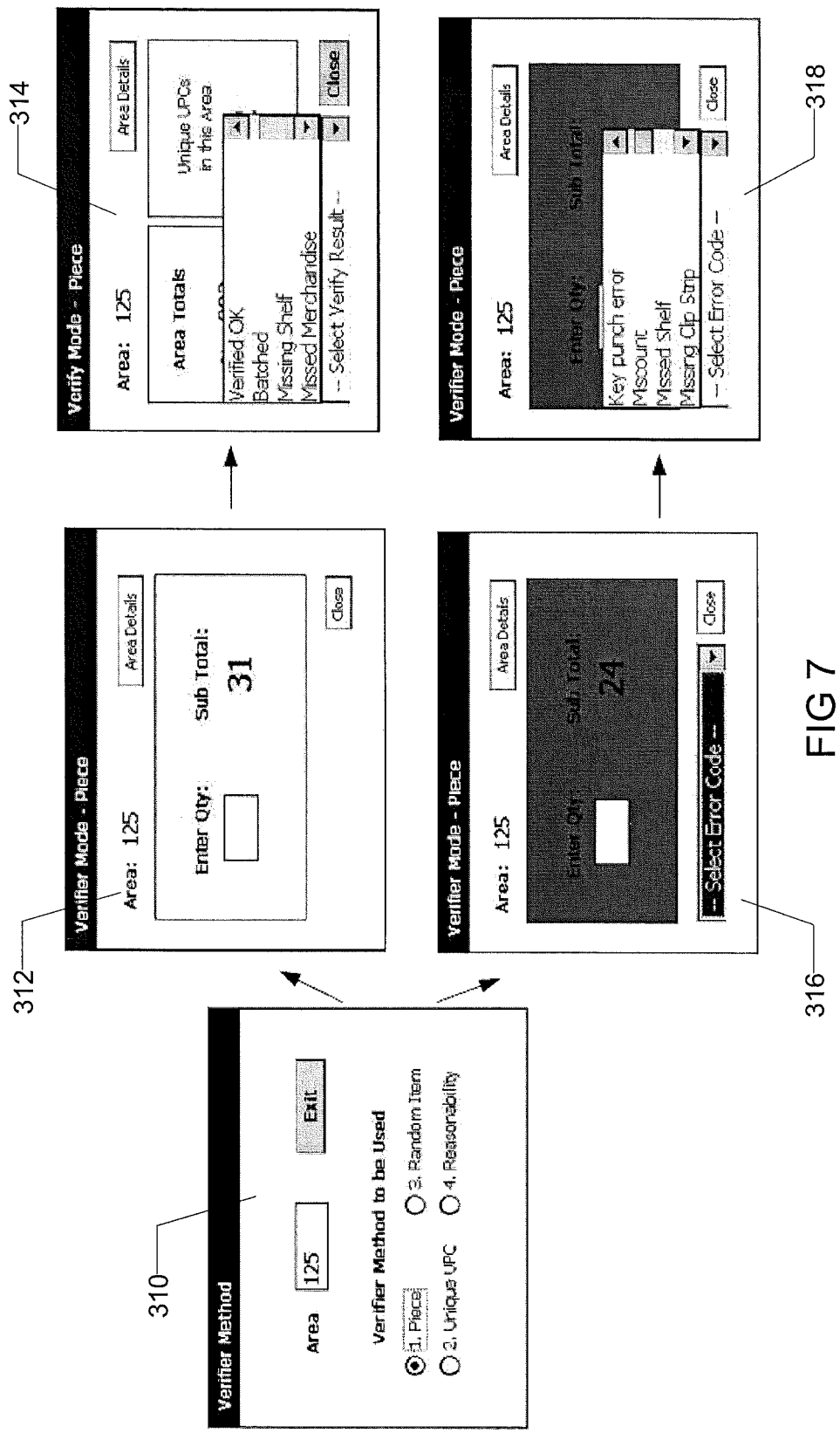
FIG. 7 illustrates screenshots of the verification device display in a piece verification mode.

With reference now to FIG. 7, the piece verification method will be described. The verification area is input into the remote verification device as shown at screen 310. A total piece count within that area is made without regard to the SKU or UPC for the products within the area. The total piece count is input into the remote verification device 20. If the total piece count matches the piece count from the inventory dataset as shown at screen 312, then a verification screen 314 is displayed on the remote verification device 20. From the verification screen 314, a verification result may be associated with the piece count in the verification dataset. If the total piece count does not match the piece count from the inventory dataset as shown at screen 316, then an error screen 318 is displayed on the remote verification device 20. From the error screen 318, an error code may be associated with the piece count in the verification dataset. Once the area verification is complete, the remote verification device 20 communicates the results back to the control desk 14.

With reference now to FIG. 8, the reasonability verification method will be described. Again, the verification area is input into the remote verification device 20 as shown at screen 320. In return, the remote verification device 20 displays the total piece count for the inputted area from the inventory dataset. The remote verification device 20 then queries the accuracy of this area total as shown at screen 322 and prompts for a response to the query. The response to the reasonableness query may be simply YES or NO, or alternately a degree of certainty such as certain, highly likely, likely, highly unlikely, or uncertain. Once the area verification is complete, the remote verification device 20 communicates the results back to the control desk 14.

With reference now to FIG. 9, the unique UPC verification method will be described. The unique UPC method is similar to the reasonability method but focuses on the number of different types of products within an area instead of the total piece count within an area. The verification area is input into the remote verification device 20 as shown at screen 330. In return, the remote verification device 20 displays the total piece count and the unique UPCs from the inventory dataset for the inputted area. The remote verification device 20 then queries the accuracy of the unique UPCs as shown at screen 332 and prompts for a response to the query. This response may be simply YES or NO, or may alternately have a degree of certainty such as certain, highly likely, likely, highly unlikely, or uncertain. Once the area verification is complete, the remote verification device 20 communicates the results back to the control desk 14.

Figure 10:
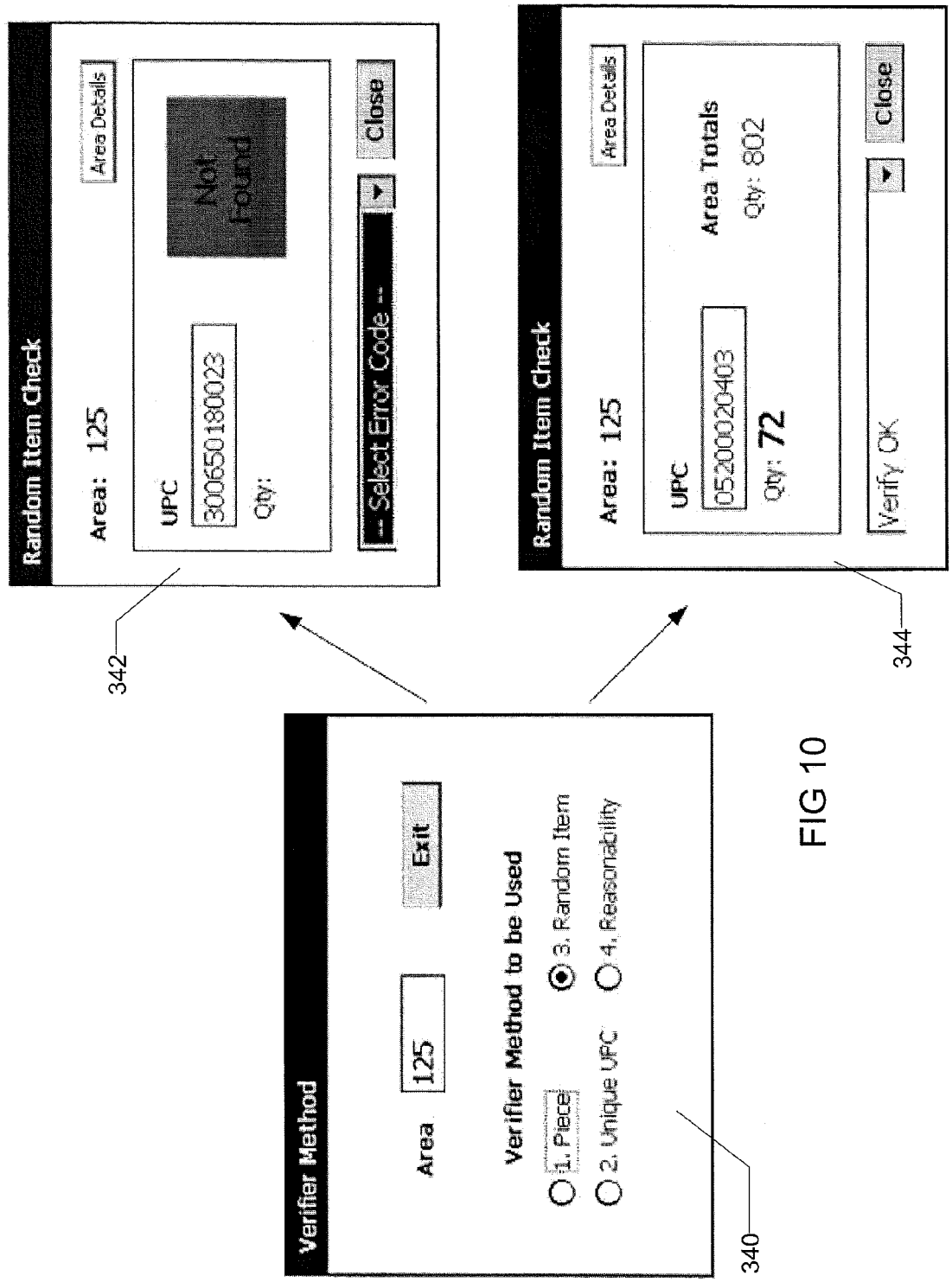
FIG. 10 illustrates screenshots of the verification device display in a random item check mode.

With reference now to FIG. 10, the random item verification method will be described. The random item method allows an inventory data query to be made on an item randomly pulled from a shelf within the verification area. The verification area is input into the remote verification device 20 as shown at screen 340. Next, an item is pulled from a shelf within the verification area, and the UPC is input into the remote verification device 20. The UPC may be input manually by typing in the UPC or alternately by scanning the bar code on the pulled item. If the inventory dataset includes an inventory count for that UPC in that area, then the remote verification device 20 displays the quantity for that UPC as well as the total piece count from the inventory dataset for the inputted area. The remote verification device 20 then queries the accuracy of inventory count for the randomly pulled item as shown at screen 342 and prompts for a response to the query. If the inventory dataset does not include an inventory count for that UPC in that area, then the remote verification device 20 displays and error message and prompts for the input of an error code, as shown at screen 344. Once the area verification is complete, the remote verification device 20 communicates the results back to the control desk 14.

From the foregoing description, one skilled in the art will understand the various aspects of a method and system for conducting inventory verification with one or more remote verification devices. The above description is merely exemplary in nature and, thus variations that do not depart from the gist of the present disclosure are intended to be within the scope of the present disclosure. Such variations are not to be regarded as a departure from the spirit and scope of the present disclosure.

What is claimed is:

1. A method for inventory verification comprising:
   downloading an inventory dataset having downloaded inventory data for a completed area from a control desk to a remote verification device;
   selecting a verification mode, which includes a set of rules that define a methodology for verifying the inventory dataset, from a plurality of verification modes, wherein the plurality of verification modes include at least two of the following verification modes: piece count verification, unique UPC verification, reasonability verification and random verification;
   deploying the remote verification device to the completed area;
   acquiring verification data in the completed area with the remote verification device based on the selected verification mode;
   computing a verification status on the remote verification device based on a comparison of the verification data with the downloaded inventory data; and
   displaying the verification status on the remote verification device.

2. The method for inventory verification of claim 1 wherein the selected verification mode is determined by an average price point determined from the inventory dataset for the completed area.

3. The method for inventory verification of claim 1 further comprising uploading the verification data from the remote verification device to the control desk.

4. The method for inventory verification of claim 3 further comprising uploading the verification status from the remote verification device to the control desk.

5. The method for inventory verification of claim 1 further comprising assigning an error code to the downloaded inventory data when the verification status indicates a difference between the verification data and the inventory data.

6. The method for inventory verification of claim 1 further comprising initiating an inventory correction procedure when the verification status indicates a difference between the verification data and the inventory data.

7. The method for inventory verification of claim 6 wherein the inventory correction procedure comprises:
   switching the remote verification device from a verification mode to an inventory mode;
   acquiring replacement inventory data for the completed area;
   substituting the replacement inventory data for the downloaded inventory data; and
   switching the remote verification device from the inventory mode to the verification mode.

8. The method for inventory verification of claim 7 further comprising uploading the replacement inventory data from the remote verification device to the control desk.

9. The method for inventory verification of claim 7 further comprising comparing the verification data with the replacement inventory data and computing a verification status based on the comparison.

10. The method for inventory verification of claim 9 further comprising uploading the verification status to the control desk.

11. The method for inventory verification of claim 1 further comprising displaying the verification status on the remote verification device.

12. The method for inventory verification of claim 1 further comprising displaying a first inventory count from the downloaded inventory data and a second inventory count from the verification data on the remote verification device.

13. The method for inventory verification of claim 1 further comprising displaying a UPC count from the downloaded inventory data and a second UPC count from the verification data on the remote verification device.

14. The method for inventory verification of claim 1 further comprising:
inputting a UPC for an item located within the completed area;
querying the downloaded inventory data to determine if the UPC is resident in the inventory dataset; and
displaying a status based on the query.

15. An inventory verification system comprising:
a control desk including a dataset having inventory data; and
a portable verification device including:
a data input module having a keypad operable to enter data and a scanner operable to read and decode a barcode symbology for acquiring verification data, a verification module operable to select a verification mode, which includes a set of rules that define a methodology for verifying the inventory dataset, from a plurality of verification modes, to compare the verification data with the inventory data and to generate a verification status, wherein the plurality of verification modes includes at least two of the following verification modes: piece count verification, unique UPC verification, reasonability verification and random verification; and
a display apparatus operable to display information including the verification status; and
a local area network for enabling wireless communication between the control desk and the portable verification device, the local area network including:
a first wireless network interface controller (WNIC) operable to transmit data signals from the control desk and receive data signals to the control desk; and
a second wireless network interface controller (WNIC) operable to transmit data signals from the verification device and receive data signals to the verification device;
wherein the first WNIC transmits data signals with the inventory data that are received to the second WNIC and wherein the first WNIC receives data signals with verification data that are transmitted from the second WNIC.

16. The inventory verification system of claim 15 further comprising an access point in communication with the first WNIC and the second WNIC.

17. The inventory verification system of claim 15 further comprising:
a portable acquisition device including a data input module having a keypad operable to enter data and a scanner operable to read and decode a barcode symbology for acquiring inventory data; and
a third wireless network interface controller (WNIC) operable to transmit data signals from the acquisition device and receive data signals to the acquisition device.

18. The method for inventory verification of claim 1 wherein the plurality of verification modes comprises piece count verification, unique UPC verification, reasonability verification and random verification.

19. The inventory verification system of claim 15 wherein the plurality of verification modes comprises piece count verification, unique UPC verification, reasonability verification and random verification.

* * * * *

(12) POST-GRANT REVIEW CERTIFICATE (33rd)
United States Patent  (10) Number: US 8,606,658 J1
Borom  (45) Certificate Issued: Jun. 23, 2017

(54) INVENTORY VERIFICATION SYSTEM AND METHOD

(75) Inventor: Michael Preston Borom

(73) Assignee: RGIS, LLC

Trial Number:

CBM2014-00158 filed Jul. 14, 2014

Petitioner: Washington Inventory Services

Patent Owner: RGIS, LLC

Post-Grant Review Certificate for:

Patent No.: 8,606,658
Issued: Dec. 10, 2013
Appl. No.: 12/204,435
Filed: Sep. 4, 2008

The results of CBM2014-00158 are reflected in this post-grant review certificate under 35 U.S.C. 328(b).

POST-GRANT REVIEW CERTIFICATE
U.S. Patent 8,606,658 J1
Trial No. CBM2014-00158
Certificate Issued Jun. 23, 2017

AS A RESULT OF THE POST-GRANT REVIEW PROCEEDING, IT HAS BEEN DETERMINED THAT:

Claims 1-19 are cancelled.

\* \* \* \* \*